US009328201B2

(12) United States Patent
Ebert et al.

(10) Patent No.: US 9,328,201 B2
(45) Date of Patent: May 3, 2016

(54) ALKOXYLATED POLYALKYLENEPOLYAMINES

(71) Applicant: BASF SE, Ludwigshafen (DE)

(72) Inventors: Sophia Ebert, Mannheim (DE); Thomas Schaub, Neustadt (DE); Julia Strautmann, Mannheim (DE); Stephan Hueffer, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/356,281

(22) PCT Filed: Nov. 19, 2012

(86) PCT No.: PCT/EP2012/072943
§ 371 (c)(1),
(2) Date: May 5, 2014

(87) PCT Pub. No.: WO2013/076024
PCT Pub. Date: May 30, 2013

(65) Prior Publication Data
US 2014/0288265 A1 Sep. 25, 2014

(30) Foreign Application Priority Data

Nov. 25, 2011 (EP) ..................................... 11190807

(51) Int. Cl.
C08G 73/02 (2006.01)
C08G 59/64 (2006.01)
C08G 59/68 (2006.01)
C08G 65/26 (2006.01)
C08G 65/30 (2006.01)

(52) U.S. Cl.
CPC ........ *C08G 73/0213* (2013.01); *C08G 65/2609* (2013.01); *C08G 65/2621* (2013.01); *C08G 65/2624* (2013.01); *C08G 65/2672* (2013.01); *C08G 73/024* (2013.01); *C08G 73/0206* (2013.01); *C08G 2650/50* (2013.01)

(58) Field of Classification Search
None
See application file for complete search history.

(56) References Cited

U.S. PATENT DOCUMENTS

| 3,708,539 | A | 1/1973 | Fenton |
| 4,645,611 | A | 2/1987 | Campbell et al. |
| 4,647,921 | A | 3/1987 | Jacoby et al. |
| 4,654,043 | A | 3/1987 | Streit et al. |
| 4,888,425 | A | 12/1989 | Herdle |
| 4,891,260 | A | 1/1990 | Kunkel et al. |
| 5,445,765 | A | 8/1995 | Elfers et al. |
| 8,637,709 | B2 | 1/2014 | Schaub et al. |
| 8,697,834 | B2 | 4/2014 | Schaub et al. |
| 8,785,693 | B2 | 7/2014 | Schaub et al. |

| 2011/0011806 | A1* | 1/2011 | Ebert et al. ............. 210/708 |
| 2012/0232293 | A1 | 9/2012 | Schaub et al. |
| 2012/0232294 | A1 | 9/2012 | Schaub et al. |
| 2013/0137901 | A1 | 5/2013 | Strautmann et al. |

FOREIGN PATENT DOCUMENTS

| CA | 2801109 | * | 12/2011 |
| EP | 0 034 480 | A2 | 8/1981 |
| EP | 0 034 480 | A3 | 8/1981 |
| EP | 0 239 934 | A2 | 10/1987 |
| WO | WO 86/05501 | A1 | 9/1986 |
| WO | WO 97/23546 | A1 | 7/1997 |
| WO | WO 2011/151268 | A1 | 12/2011 |

OTHER PUBLICATIONS

International Search Report issued Mar. 19, 2013 in PCT/EP2012/072943.
Ryoko Kawahara, et al., "N-Alkylation of amines with alcohols catalyzed by a water-soluble Cp*Iridium complex: An efficient method for the synthesis of amines in aqueous media", Advanced Synthesis & Catalysis, vol. 353, No. 7, XP055055911, May 9, 2011, pp. 1161-1168.
Jakob Norinder, et al., "Highly efficient and selective catalytic N-Alkylation of amines with alcohols in water", ChemCatChem, vol. 3, No. 9, XP055055913, Jul. 11, 2011, pp. 1407-1409.
Natalia Andrushko, et al., "Amination of aliphatic alcohols and diols with an iridium pincer catalyst", ChemCatChem, vol. 2, No. 6, XP055026530, Jun. 7, 2010, pp. 640-643.
Annegret Tillack, et al., "A novel ruthenium-catalyzed amination of primary and secondary alcohols", Tetrahedron Letters, vol. 47, No. 50, XP025003579, Dec. 11, 2006, pp. 8881-8885.
International Search Report issued Mar. 19, 2013 in PCT/EP2012/072943 (English translation previously filed).
U.S. Appl. No. 14/359,134, filed May 19, 2014, Strautmann, et al.
U.S. Appl. No. 14/357,822, filed May 13, 2014, Strautmann, et al.

* cited by examiner

*Primary Examiner* — Ana Woodward
(74) *Attorney, Agent, or Firm* — Oblon, McClelland, Maier & Neustadt, L.L.P.

(57) ABSTRACT

Process for the preparation of alkoxylated polyalkylenepolyamines, comprising the following steps (a) homogeneously catalyzed alcohol amination, where aliphatic amino alcohols are reacted with one another or aliphatic diamines or polyamines are reacted with aliphatic diols or polyols with the elimination of water in the presence of a homogeneous catalyst to give polyalkylenepolyamines, (b) reaction of these polyalkylenepolyamines with alkylene oxides to give alkoxylated polyalkylenepolyamines. Specific alkoxylated polyalkylenepolyamines obtainable by such processes and alkoxylated polyalkylenepolyamines and processes for their preparation. Uses of alkoxylated polyalkylenepolyamines as detergent additives, dispersants, textile auxiliaries, wood protectants, corrosion inhibitors.

8 Claims, No Drawings

ALKOXYLATED POLYALKYLENEPOLYAMINES

The present invention relates to a process for the preparation of alkoxylated polyalkylenepolyamines by reacting alkylene oxides with polyalkylenepolyamines which are prepared by homogeneous-catalytic alcohol amination of alkanolamines or of di- or polyamines with diols or polyols. Furthermore, the invention also relates to alkoxylated polyalkylenepolyamines obtainable by these processes and to the use of alkoxylated polyalkylenepolyamines. The invention further provides specific alkoxylated polyalkylenepolyamines and their preparation.

Further embodiments of the present invention can be found in the claims, the description and the examples. It goes without saying that the features of the subject matter according to the invention that have been specified above and are still to be explained below can be used not only in the combination specifically stated in each case, but also in other combinations, without departing from the scope of the invention. The embodiments of the present invention in which all features have the preferred or very preferred meanings are preferred or very preferred, respectively.

Polyethyleneimines are valuable products with a large number of different uses. For example, polyethyleneimines are used: a) as adhesion promoters for printing inks for laminate films; b) as auxiliaries (adhesion) for producing multiply composite films, where not only are different polymer layers compatibilized, but also metal films; c) as adhesion promoters for adhesives, for example in conjunction with polyvinyl alcohol, butyrate and acetate and styrene copolymers, or as cohesion promoter for label adhesives; d) low molecular weight polyethyleneimines can moreover be used as crosslinkers/hardeners in epoxy resins and polyurethane adhesives; e) as primers in coating applications for improving adhesion on substrates such as glass, wood, plastic and metal; f) for improving wet adhesion in standard emulsion paints and also for improving the instantaneous rain resistance of paints for example for road markings; g) as complexing agent with high binding capacity for heavy metals such as Hg, Pb, Cu, Ni and flocculants in water treatment/water processing; h) as penetration auxiliaries for active metal salt formulations in wood preservation; i) as corrosion inhibitors for iron and nonferrous metals; j) for the immobilization of proteins and enzymes. For these applications, it is also possible to use polyalkylenepolyamines which are not derived from the ethyleneimine.

Polyethyleneimines are currently obtained by the homopolymerization of ethyleneimine. Ethyleneimine is a highly reactive, corrosive and toxic intermediate which can be synthesized in different ways (aziridines, Ulrich Steuerle, Robert Feuerhake; in Ullmann's Encyclopedia of Industrial Chemistry, 2006, Wiley-VCH, Weinheim).

In the β-chloroethylamine process, ethyleneimine is obtained by reacting β-chloroethylamine with NaOH. This process may lead to the undesired polymerization of the β-chloroethylamine by HCl elimination, which must be carefully avoided. Moreover, the use of two equivalents of NaOH and the formation of the coproduct NaCl is disadvantageous.

In the Dow process, the ethyleneimine can be obtained by reacting 1,2-dichloroethane with three equivalents of ammonia. The use of large amounts of ammonia, the formation of the coproduct ammonium chloride, the corrosivity of the reaction mixture and also impurities in the product are disadvantageous.

In the Wencker process, in the first step, 2-aminoethanol is reacted with sulfuric acid to give 2-aminoethyl hydrogensulfate. The ethyleneamine is then obtained from this in the second step by adding two equivalents of NaOH. Here too, the use of sulfuric acid and NaOH and also the formation of the coproduct sodium sulfate are disadvantageous.

During the catalytic dehydrogenation of 2-aminoethanol, the ethyleneimine is obtained by the catalytic dehydrogenation of 2-aminoethanol in the gas phase at 250-450° C. Disadvantages of this process are the complex product work-up by distillation, the high energy requirement and also the short catalyst life.

Besides the stated disadvantages of the processes for the preparation of ethyleneimine, the synthesis of polyethyleneimines starting from this starting compound is problematic since the highly reactive, toxic and corrosive ethyleneimine has to be handled. It likewise has to be ensured that no ethyleneimine remains in the products obtained and/or wastewater streams.

For the preparation of polyalkylenepolyamines —[$(CH_2)_x$N]— with alkylene groups >$C_2$ (x>2) not derived from aziridine, there are no processes analogous to the aziridine route, as a result of which there has hitherto been no cost-effective process for their preparation.

The homogenously catalyzed amination of alcohols is known from the literature for the synthesis of primary, secondary and tertiary amines starting from alcohols and amines, with monomeric products being obtained in all of the described embodiments.

U.S. Pat. No. 3,708,539 describes the synthesis of primary, secondary and tertiary amines using a ruthenium-phosphane complex.

Y. Watanabe, Y. Tsuji, Y. Ohsugi Tetrahedron Lett. 1981, 22, 2667-2670 reports on the preparation of arylamines by the amination of alcohols with aniline using [$Ru(PPh_3)_3Cl_2$] as catalyst.

EP 0 034 480 A2 discloses the preparation of N-alkyl- or N,N-dialkylamines by the reaction of primary or secondary amines with a primary or secondary alcohol using an iridium, rhodium, ruthenium, osmium, platinum, palladium or rhenium catalyst.

EP 0 239 934 A1 describes the synthesis of mono- and diaminated products starting from diols such as ethylene glycol and 1,3-propanediol with secondary amines using ruthenium and iridium phosphane complexes.

K. I. Fujita, R. Yamaguchi Synlett, 2005, 4, 560-571 describes the synthesis of secondary amines by the reaction of alcohols with primary amines and also the synthesis of cyclic amines by the reaction of primary amines with diols by ring closure using iridium catalysts.

In A. Tillack, D. Hollmann, K. Mevius, D. Michalik, S. Bähn, M. Beller Eur. J. Org. Chem. 2008, 4745-4750, in A. Tillack, D. Hollmann, D. Michalik, M. Beller Tetrahedron Lett. 2006, 47, 8881-8885, in D. Hollmann, S. Bähn, A. Tillack, M. Beller Angew. Chem. Int. Ed. 2007, 46, 8291-8294 and in M. Haniti, S. A. Hamid, C. L. Allen, G. W. Lamb, A. C. Maxwell, H. C. Maytum, A. J. A. Watson, J. M. J. Williams J. Am. Chem. Soc, 2009, 131, 1766-1774 syntheses of secondary and tertiary amines starting from alcohols and primary or secondary amines using homogeneous ruthenium catalysts are described.

The synthesis of primary amines by reacting alcohols with ammonia using a homogeneous ruthenium catalyst is reported in C. Gunanathan, D. Milstein Angew. Chem. Int. Ed. 2008, 47, 8661-8664.

Our unpublished application PCT/EP2011/058758 describes general processes for the preparation of polyalkylenepolyamines by catalytic alcohol amination of alkanolamines or of diamines or polyamines with diols or polyols.

Alkoxylated polyamines such as, for example, alkoxylated polyethyleneimines, are used widely, for example as detergent additive, dispersant, textile auxiliary, wood protectant, corrosion inhibitor. The use of alkoxylated polyethyleneimines is described for example in the patent specifications: U.S. Pat. Nos. 4,891,260, 4,647,921, 4,654,043, and 4,645,611.

It is an object of the present invention to find a process for the preparation of alkoxylated polyalkylenepolyamines in which no aziridine is used, no undesired coproducts are formed and products of a desired chain length are obtained.

The object is achieved by a process for the preparation of alkoxylated polyalkylenepolyamines comprising the steps (a) of a homogeneously catalyzed alcohol amination, where (i) aliphatic amino alcohols are reacted with one another or (ii) aliphatic diamines or polyamines are reacted with aliphatic diols or polyols with the elimination of water in the presence of a homogeneous catalyst to give polyalkylenepolyamines, and (b) of a reaction of these polyalkylenepolyamines with alkylene oxides to give alkoxylated polyalkylenepolyamines.

Within the context of this invention, expressions of the form $C_a$-$C_b$ refer to chemical compounds or substituents with a certain number of carbon atoms. The number of carbon atoms can be selected from the entire range from a to b, including a and b, a is at least 1 and b is always greater than a. The chemical compounds or substituents are further specified by expressions of the form $C_a$-$C_b$-V. V here stands for a chemical compound class or substituent class, for example alkyl compounds or alkyl substituents.

Specifically, the collective terms stated for the various substituents have the following meaning:

$C_1$-$C_{50}$-Alkyl: straight-chain or branched hydrocarbon radicals having up to 50 carbon atoms, for example $C_1$-$C_{10}$-alkyl or $C_{11}$-$C_{20}$-alkyl, preferably $C_1$-$C_{10}$-alkyl, for example $C_1$-$C_3$-alkyl, such as methyl, ethyl, propyl, isopropyl, or C4-C6-alkyl, n-butyl, sec-butyl, tert-butyl, 1,1-dimethylethyl, pentyl, 2-methylbutyl, 1,1-dimethylpropyl, 1,2-dimethylpropyl, 2,2-dimethylpropyl, 1-ethylpropyl, hexyl, 2-methylpentyl, 3-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 2-ethylbutyl, 1,1,2-trimethylpropyl, 1,2,2-trimethylpropyl, 1-ethyl-1-methylpropyl, 1-ethyl-2-methylpropyl, or $C_7$-$C_{10}$-alkyl, such as heptyl, octyl, 2-ethylhexyl, 2,4,4-trimethylpentyl, 1,1,3,3-tetramethylbutyl, nonyl or decyl, and isomers thereof.

$C_3$-$C_{15}$-Cycloalkyl: monocyclic, saturated hydrocarbon groups having from 3 up to 15 carbon ring members, preferably $C_3$-$C_8$-cycloalkyl such as cyclopropyl, cyclobutyl, cyclopentyl, cyclohexyl, cycloheptyl or cyclooctyl, and also a saturated or unsaturated cyclic system such as e.g. norbornyl or norbenzyl.

Aryl: a mono- to trinuclear aromatic ring system comprising 6 to 14 carbon ring members, e.g. phenyl, naphthyl or anthracenyl, preferably a mono- to dinuclear, particularly preferably a mononuclear, aromatic ring system.

Within the context of the present invention, the symbol "*" indicates, for all chemical compounds, the valence via which one chemical group is bonded to another chemical group.

Aliphatic amino alcohols which are suitable for step (a) of the process according to the invention comprise at least one primary or secondary amino group and at least one OH group. Examples are linear, branched or cyclic alkanolamines such as monoethanolamine, diethanolamine, aminopropanol, for example 3-aminopropan-1-ol or 2-aminopropan-1-ol, aminobutanol, for example 4-aminobutan-1-ol, 2-aminobutan-1-ol or 3-aminobutan-1-ol, aminopentanol, for example 5-aminopentan-1-ol or 1-aminopentan-2-ol, aminodimethylpentanol, for example 5-amino-2,2-dimethylpentanol, aminohexanol, for example 2-aminohexan-1-ol or 6-aminohexan-1-ol, aminoheptanol, for example 2-aminoheptan-1-ol or 7-aminoheptan-1-ol, aminooctanol, for example 2-aminooctan-1-ol or 8-aminooctan-1-ol, aminononanol, for example 2-aminononan-1-ol or 9-aminononan-1-ol, aminodecanol, for example 2-aminodecan-1-ol or 10-aminodecan-1-ol, aminoundecanol, for example 2-aminoundecan-1-ol or 11-aminoundecan-1-ol, aminododecanol, for example 2-aminododecan-1-ol or 12-aminododecan-1-ol, aminotridecanol, for example 2-aminotridecan-1-ol, 1-(2-hydroxyethyl)piperazine, 2-(2-amino-ethoxy)ethanol, alkylalkanolamines, for example butylethanolamine, propylethanolamine, ethylethanolamine, methylethanolamine. Particular preference is given to monoethanolamine and monopropanolamine.

Aliphatic diamines which are suitable for step (a) of the process according to the invention comprise at least two primary or at least one primary and one secondary or at least two secondary amino groups, they preferably comprise two primary amino groups. Examples are linear, branched or cyclic aliphatic diamines. Examples are ethylenediamine, 1,3-propylenediamine, 1,2-propylenediamine, butylenediamine, for example 1,4-butylenediamine or 1,2-butylenediamine, diaminopentane, for example 1,5-diaminopentane or 1,2-diaminopentane, 1,5-diamino-2-methylpentane, diaminohexane, for example 1,6-diaminohexane or 1,2-diaminohexane, diaminoheptane, for example 1,7-diaminoheptane or 1,2-diaminoheptane, diaminooctane, for example 1,8-diaminooctane or 1,2-diaminooctane, diaminononane, for example 1,9-diaminononane or 1,2-diaminononane, diaminodecane, for example 1,10-diaminodecane or 1,2-diaminodecane, diaminoundecane, for example 1,11-diaminoundecane or 1,2-diaminoundecane, diaminododecane, for example 1,12-diaminododecane or 1,2-diaminododecane, 3,3'-dimethyl-4,4'-diaminodicyclohexylmethane, 4,4'-diaminodicyclohexylmethane, isophoronediamine, 2,2-dimethylpropane-1,3-diamine, 4,7,10-trioxamidecane-1,13-diamine, 4,9-dioxadodecane-1,12-diamine, polyetheramines, piperazine, 3-(cyclohexylamino)propylamine, 3-(methylamino)propylamine, N,N-bis(3-aminopropyl)methylamine.

Aliphatic diols suitable for step (a) are linear, branched or cyclic aliphatic diols. Examples of aliphatic diols are ethylene glycol, 1,2-propylene glycol, 1,3-propylene glycol, 2-methyl-1,3-propanediol, butanediols, for example 1,4-butylene glycol or butane-2,3-diol or 1,2-butylene gylcol, pentanediols, for example neopentyl glycol or 1,5-pentanediol or 1,2-pentanediol, hexanediols, for example 1,6-hexanediol or 1,2-hexanediol, heptanediols, for example 1,7-heptanediol or 1,2-heptanediol, octanediols, for example 1,8-octanediol or 1,2-octanediol, nonanediols, for example 1,9-nonanediol or 1,2-nonanediol, decanediols, for example 1,10-decanediol or 1,2-decanediol, undecanediols, for example 1,11-undecanediol or 1,2-undecanediol, dodecanediols, for example 1,12-dodecanediol, 1,2-dodecanediol, tridecanediols, for example 1,13-tridecanediol or 1,2-tridecanediol, tetradecanediols, for example 1,14-tetradecanediol or 1,2-tetradecanediol, pentadecanediols, for example 1,15-pentadecanediol or 1,2-pentadecanediol, hexadecanediols, for example 1,16-hexadecanediol or 1,2-hexadecanediol, heptadecanediols, for example 1,17-heptadecanediol or 1,2-heptadecanediol, octadecanediols, for example 1,18-octadecanediol or 1,2-octadecanediol, 3,4-dimethyl-2,5-hexanediol, polyTHF, 1,4-bis(2-hydroxyethyl)-piperazine, diethanolamines, for example butyldiethanolamine or methyldiethanolamine, dialcoholamines and trialcoholamines.

Preferred alkoxylated polyalkylenepolyamines obtainable according to the invention and/or the polyalkylenepolyamines obtainable in step (a) comprise $C_2$-$C_{50}$-alkylene units, particularly preferably $C_2$-$C_{20}$-alkylene units. These can be linear or branched, they are preferably linear. Examples are ethylene, propylene, for example 1,3-propylene, butylene, for example 1,4-butylene, pentylene, for example 1,5-pentylene or 1,2-pentylene, hexylene, for example 1,6-hexylene, octylene, for example 1,8-octylene or 1,2-octylene, nonylene, for example 1,9-nonylene or 1,2-nonylene, decylene, for example 1,2-decylene or 1,10-decylene, undecylene, for example 1,2-undecylene, dodecylene, for example 1,12-dodecylene or 1,2-dodecylene, tridecylene, for example 1,2-tridecylene, octyl, nonyl, decyl, undecyl, dodecyl, tridecyl, neopentylene. Cycloalkylene units are also possible, for example 1,3- or 1,4-cyclohexylene. The alkoxylated polyalkylenepolyamines particularly preferably have $C_2$-alkylene units.

It is also possible to use mixtures of aliphatic amino alcohols or mixtures of alkanediols or mixtures of diaminoalkanes in the respective reactions in step (a). The polyalkylenepolyamines resulting in step (a) can comprise alkylene units of different length.

In step (a), polyfunctional amino alcohols having more than one OH group or more than one primary or secondary amino group can also be reacted with one another. In this case, highly branched products are obtained. Examples of polyfunctional amino alcohols are diethanolamine, N-(2-aminoethyl)ethanolamine, diisopropanolamine, diisononanolamine, diisodecanolamine, diisoundecanolamine, diisododecanolamine, diisotridecanolamine.

In step (a), polyols or mixtures of diols and polyols can also be reacted with diamines. Polyamines or mixtures of diamines and polyamines can also be reacted with diols. Polyols or mixtures of diols and polyols can also be reacted with polyamines or mixtures of diamines and polyamines. In this case, highly branched products are obtained. Examples of polyols are glycerol, trimethylolpropane, sorbitol, triethanolamine, triisopropanolamine. Examples of polyamines are diethylenetriamine, tris(aminoethyl)amine, triazine, 3-(2-aminoethylamino)-propylamine, dipropylenetriamine, N,N'-bis(3-aminopropyl)ethylenediamine.

Particularly suitable compounds in step (a) are those in which at least one of the starting materials aliphatic amino alcohols, aliphatic diamines or polyamines or aliphatic diols or polyols comprises an alkyl or alkylene group having from 2 to 4 carbon atoms.

Compounds particularly suitable for the reaction in step (a) are likewise those in which at least one of the starting materials aliphatic amino alcohols, aliphatic diamines or polyamines or aliphatic diols or polyols comprises an alkyl or alkylene group having five or more, preferably seven or more, particularly preferably nine or more, in particular twelve or more, carbon atoms.

Particularly suitable compounds in step (a) are those in which at least one of the starting materials aliphatic amino alcohols, aliphatic diamines or polyamines or aliphatic diols or polyols comprises an alkyl or alkylene group having from 5 to 50, preferably from 5 to 20, particularly preferably from 6 to 18, very particularly preferably from 7 to 16, especially preferably from 8 to 14 and in particular from 9 to 12 carbon atoms.

For the synthesis in step (a), preference is given to selecting at least (i) monoethanolamine, monopropanolamine or (ii) ethylene glycol with ethylenediamine. Furthermore, preferably at least (ii) ethylenediamine or 1,2-propylenediamine or 1,3-propylenediamine and 1,2-decanediol or 1,2-dodecanediol are preferably selected.

Hydroxy and amino groups in diols, polyols and diamines, polyamines in step (a) are preferably used in molar ratios of from 20:1 to 1:20, particularly preferably in ratios of from 8:1 to 1:8, in particular from 3:1 to 1:3.

Polyalkylenepolyamines can also be reacted in step (a). During the reaction, diamines or polyamines or diols or polyols or amino alcohols can be added.

The preparation of the polyalkylenepolyamines in step (a) is illustrated by way of example by equations 1 and 2:

Equation 1

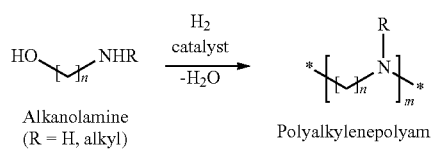

Alkanolamine
(R = H, alkyl)

Polyalkylenepolyamine

Equation 2

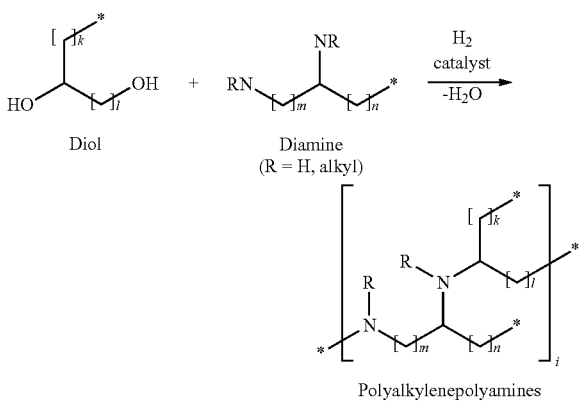

Diol        Diamine
(R = H, alkyl)

Polyalkylenepolyamines

In a preferred embodiment of the process according to the invention, in step (a), after the reaction, preferably after cooling, in particular to room temperature, preferably after adding a preferably polar solvent, in particular water, a phase separation into at least one nonpolar phase and at least one polar phase is present. Here, the polyalkylenepolyamine is particularly preferably enriched in the nonpolar phase, in particular those polyalkylenepolyamines which comprise alkyl or alkylene groups having five or more carbon atoms. Particularly preferably, the homogeneous catalyst is enriched here in the polar phase.

A homogeneous catalyst is understood as meaning a catalyst which is present in the reaction medium in homogeneously dissolved form during the reaction.

The homogeneous catalyst generally comprises at least one element of the sub-groups of the Periodic Table of the Elements (transition metal). The alcohol amination in step (a) can be carried out in the presence or absence of an additional solvent. The alcohol amination can be carried out in a multiphase, preferably one-phase or two-phase, liquid system at temperatures of generally 20 to 250° C. In the case of two-phase reaction systems, the upper phase can consist of a nonpolar solvent, which comprises the majority of the homogeneously dissolved catalyst, and the lower phase comprising the polar starting materials, the polyamines formed and also water. Furthermore, the lower phase can consist of water and also the homogeneously dissolved catalyst and the upper phase can consist of a nonpolar solvent which comprises the majority of the polyamines formed and the nonpolar starting materials.

In a preferred embodiment of the invention, in step (a), (i) monoethanolamine or (ii) monopropanolamine or (iii) diamines selected from ethylenediamine, 1,3-propylenediamine or 1,2-propylenediamine is reacted with diols selected from ethylene glycol, 1,2-decanediol or 1,2-dodecanediol in the presence of a homogeneous catalyst and under a hydrogen pressure of from 1 to 10 MPa and with removal of the water that is formed during the reaction.

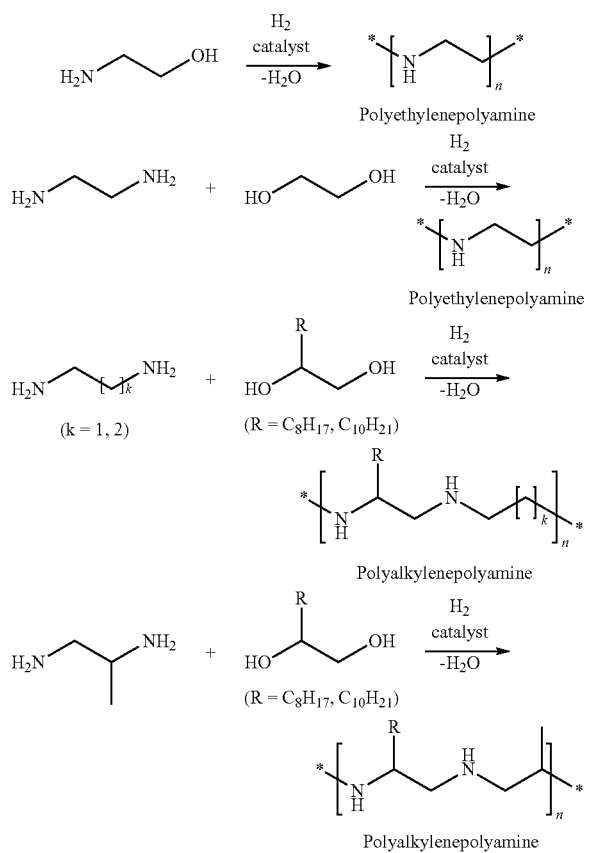

The number of alkylene units n in the polyalkylenepolyamines is generally between 3 and 50 000.

The polyalkylenepolyamines thus obtained in step (a) can carry both $NH_2$ and also OH groups as end groups at the chain ends.

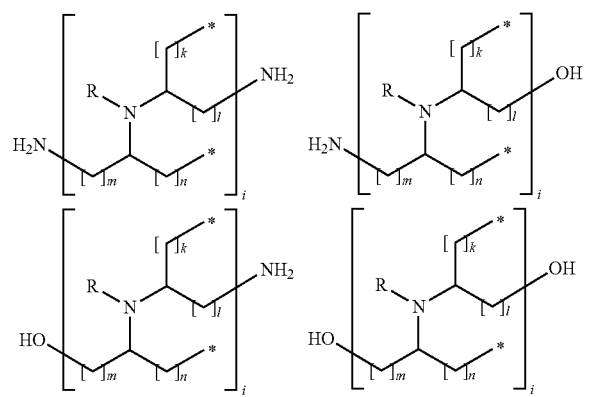

where preferably

R independently of one another, are identical or different and are H, $C_1$-$C_{50}$-alkyl, l, m independently of one another, are identical or different and are an integer from the range from 1 to 50, preferably from 1 to 30, particularly preferably from 1 to 20, n, k independently of one another, are identical or different and are an integer from the range from 0 to 50, preferably from 0 to 30, particularly preferably from 0 to 20, i is an integer from the range from 3 to 50 000.

The number-average molecular weight Mn of the polyalkylenepolyamines obtained in step (a) is generally from 200 to 2 000 000, preferably from 400 to 750 000 and particularly preferably from 400 to 50 000. The molar mass distribution Mw/Mn is generally in the range from 1.2 to 20, preferably from 1.5-7.5. The cationic charge density (at pH 4-5) is generally in the range from 4 to 22 mequ/g of dry substance, preferably in the range from 6 to 18 mequ/g.

The polyalkylenepolyamines obtained according to step (a) can be present either in linear form or in branched or multi-branched form, and also have ring-shaped structural units.

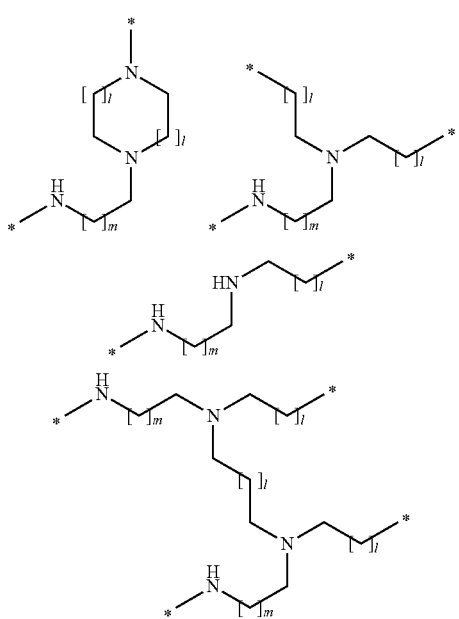

In this connection, the distribution of the structural units (linear, branched or cyclic) is random. The polyalkylenepolyamines thus obtained differ from the polyethyleneimines prepared from ethyleneimine by virtue of the OH end groups present and also optionally by virtue of different alkylene groups.

The homogeneous catalyst in step (a) is preferably a transition metal complex catalyst which comprises one or more different metals of the sub-groups of the Periodic Table of the Elements, preferably at least one element from groups 8, 9 and 10 of the Periodic Table of the Elements, particularly preferably ruthenium or iridium. The specified sub-group metals are present in the form of complex compounds. Numerous different ligands are contemplated.

Suitable ligands present in the transition metal complex compounds are, for example, phosphines substituted with alkyl or aryl, polydentate phosphines substituted with alkyl or aryl which are bridged via arylene or alkylene groups, nitrogen-heterocyclic carbenes, cyclopentanedienyl and pentamethylcyclopentadienyl, aryl, olefin ligands, hydride, halide, carboxylate, alkoxylate, carbonyl, hydroxide, trialkylamine, dialkylamine, monoalkylamine, nitrogen aromatics such as pyridine or pyrrolidine and polydentate amines. The organometallic complex can comprise one or more different specified ligands.

Preferred ligands are (monodentate) phosphines or (polydentate) polyphosphines, for example diphosphines, with at least one unbranched or branched, acyclic or cyclic, aliphatic, aromatic or araliphatic radical having 1 to 20, preferably 1 to 12 carbon atoms. Examples of branched cycloaliphatic and araliphatic radicals are —$CH_2$—$C_6H_{11}$ and —$CH_2$—$C_6H_5$. Suitable radicals which may be mentioned by way of example are: methyl, ethyl, 1-propyl, 2-propyl, 1-butyl, 2-butyl, 1-(2-methyl)propyl, 2-(2-methyl)propyl, 1-pentyl, 1-hexyl, 1-heptyl, 1-octyl, 1-nonyl, 1-decyl, 1-undecyl, 1-dodecyl, cyclopentenyl, cyclohexyl, cycloheptyl and cyclooctyl, methylcyclopentyl, methylcyclohexyl, 1-(2-methyl)pentyl, 1-(2-ethyl)hexyl, 1-(2-propylheptyl), adamantyl and norbornyl, phenyl, tolyl and xylyl, and 1-phenylpyrrole, 1-(2-methoxyphenyl)pyrrole, 1-(2,4,6-trimethylphenyl)imidazole and 1-phenylindole. The phosphine group can comprise two or three of the specified unbranched or branched, acyclic or cyclic, aliphatic, aromatic or araliphatic radicals. These may be identical or different.

Preferably, the homogeneous catalyst in step (a) comprises a monodentate or polydentate phosphine ligand comprising an unbranched, acyclic or cyclic aliphatic radical having from 1 to 12 carbon atoms or an aryliphatic radical or adamantyl or 1-phenylpyrrole as radical.

In the specified unbranched or branched, acyclic or cyclic, aliphatic, aromatic or araliphatic radicals, individual carbon atoms can also be substituted by further phosphine groups. Also comprised are thus polydentate, for example bi- or tridentate, phosphine ligands, the phosphine groups of which are bridged by alkylene or arylene groups. The phosphine groups are preferably bridged by 1,2-phenylene, methylene, 1,2-ethylene, 1,2-dimethyl-1,2-ethylene, 1,3-propylene, 1,4-butylene and 1,5-propylene bridges.

Particularly suitable monodentate phosphine ligands are triphenylphosphine, tritolylphosphine, tri-n-butylphosphine, tri-n-octylphosphine, trimethylphosphine and triethylphosphine, and also di(1-adamantyl)-n-butylphosphine, di(1-adamantyl)benzylphosphine, 2-(dicyclohexylphosphino)-1-phenyl-1H-pyrrole, 2-(dicyclohexylphosphino)-1-(2,4,6-trimethylphenyl)-1H-imidazole, 2-(dicyclohexylphosphino)-1-phenylindole, 2-(di-tert-butylphosphino)-1-phenylindole, 2-(dicyclohexylphosphino)-1-(2-methoxyphenyl)-1H-pyrrole, 2-(di-tert-butylphosphino)-1-(2-methoxyphenyl)-1H-pyrrole and 2-(di-tert-butylphosphino)-1-phenyl-1H-pyrrole. Very particular preference is given to triphenylphosphine, tritolylphosphine, tri-n-butylphosphine, tri-n-octylphosphine, trimethylphosphine and triethylphosphine, and also di(1-adamantyl)-n-butylphosphine, 2-(dicyclohexylphosphino)-1-phenyl-1H-pyrrole and 2-(di-tert-butylphosphino)-1-phenyl-1H-pyrrole.

Particularly suitable polydentate phosphine ligands are bis(diphenylphosphino)methane, 1,2-bis(diphenylphosphino)ethane, 1,2-dimethyl-1,2-bis(diphenylphosphino)ethane, 1,2-bis(dicyclohexylphosphino)ethane, 1,2-bis(diethylphosphino)ethane, 1,3-bis(diphenyl-phosphino)propane, 1,4-bis(diphenylphosphino)butane, 2,3-bis(diphenylphosphino)butane, 1,3-bis(diphenylphosphino)propane, 1,1,1-tris(diphenylphosphinomethyl)ethane, 1,1'-bis(diphenylphosphanyl)ferrocene and 4,5-bis(diphenylphosphino)-9,9-dimethylxanthene.

Furthermore, mention may preferably be made of nitrogen-heterocyclic carbenes as particularly suitable ligands for the catalyst in step (a). In this connection, those ligands which form water-soluble complexes with Ru are very preferred. Particular preference is given to 1-butyl-3-methylimidazolin-2-ylidene, 1-ethyl-3-methylimidazolin-2-ylidene, 1-methylimidazolin-2-ylidene and dipropylimidazolin-2-ylidene.

Particularly suitable ligands for the catalyst in step (a) which may be mentioned are also cyclopentadienyl and its derivatives mono- to pentasubstituted with alkyl, aryl and/or hydroxy, such as, for example, methylcyclopentadienyl, pentamethylcyclopentadienyl, tetraphenyl-hydroxycyclopentadienyl and pentaphenylcyclopentadienyl. Further particularly suitable ligands are indenyl and its derivatives substituted as described for cyclopentadienyl.

Likewise particularly suitable ligands for the catalyst in step (a) are chloride, hydride and carbonyl.

The transition metal complex catalyst in step (a) can of course comprise two or more different or identical ligands described above.

The homogeneous catalysts can be used either directly in their active form or else be produced starting from customary standard complexes such as, for example, [Ru(p-cymene)$Cl_2]_2$, [Ru(benzene)$Cl_2]_n$, [Ru(CO)$_2Cl_2]_n$, [Ru(CO)$_3Cl_2]_2$, [Ru(COD)(allyl)], [RuCl$_3$*$H_2O$], [Ru(acetylacetonate)$_3$], [Ru(DMSO)$_4Cl_2$], [Ru(PPh$_3$)$_3$(CO)(H)Cl], [Ru(PPh$_3$)$_3$(CO)Cl$_2$], [Ru(PPh$_3$)$_3$(CO)(H)$_2$], [Ru(PPh$_3$)$_3Cl_2$], [Ru(cyclopentadienyl)(PPh$_3$)$_2$Cl], [Ru(cyclopentadienyl)(CO)$_2$Cl], [Ru(cyclopentadienyl)(CO)$_2$H], [Ru(cyclopentadienyl)(CO)$_2$]$_2$, [Ru(pentamethylcyclopentadienyl)(CO)$_2$Cl], [Ru(pentamethylcyclopentadienyl)(CO)$_2$H], [Ru(pentamethylcyclopentadienyl)(CO)$_2$]$_2$, [Ru(indenyl)(CO)$_2$Cl], [Ru(indenyl)(CO)$_2$H], [Ru(indenyl)(CO)$_2$]$_2$, ruthenocene, [Ru(binap)Cl$_2$], [Ru(bipyridine)$_2$Cl$_2$*$2H_2O$], [Ru(COD)Cl$_2$]$_2$, [Ru(pentamethylcyclopentadienyl)(COD)Cl], [Ru$_3$(CO)$_{12}$], [Ru(tetraphenylhydroxy-cyclopentadienyl)(CO)$_2$H], [Ru(PMe$_3$)$_4$(H)$_2$], [Ru(PEt$_3$)$_4$(H)$_2$], [Ru(PnPr$_3$)$_4$(H)$_2$], [Ru(PnBu$_3$)$_4$(H)$_2$], [Ru(PnOctyl$_3$)$_4$(H)$_2$], [IrCl$_3$*$H_2O$], KIrCl$_4$, K$_3$IrCl$_6$, [Ir(COD)Cl]$_2$, [Ir(cyclooctene)$_2$Cl]$_2$, [Ir(ethene)$_2$Cl]$_2$, [Ir(cyclopentadienyl)Cl$_2$]$_2$, [Ir(pentamethylcyclopentadienyl)Cl$_2$]$_2$, [Ir(cyclopenta-dienyl)(CO)$_2$], [Ir(pentamethylcyclopentadienyl)(CO)$_2$], [Ir(PPh$_3$)$_2$(CO)(H)], [Ir(PPh$_3$)$_2$(CO)(Cl)], [Ir(PPh$_3$)$_3$(Cl)] with the addition of the corresponding ligands, preferably the aforementioned mono- or polydentate phosphine ligands or the aforementioned nitrogen-heterocyclic carbenes, only under the reaction conditions.

The amount of the metal component in the catalyst in step (a), preferably ruthenium or iridium, is generally 0.1 to 5000 ppm by weight, in each case based on the total liquid reaction mixture.

The process according to the invention in step (a) can be carried out either in a solvent or without solvent. The process according to the invention can of course also be carried out in a solvent mixture.

If the reaction in step (a) is carried out without solvent, then after the reaction, in particular after the cooling to ambient temperature, and optionally after the addition of a solvent or solvent mixture after step (a), a nonpolar phase and a polar aqueous phase are present. After the reaction, the homogeneous catalyst is preferably present in dissolved form in the polar phase, whereas the product is present in the nonpolar phase. If the catalyst is in the polar phase, then it can be separated off from product by phase separation. If the catalyst is partially or completely present in the nonpolar phase, then it can remain in the product or can be depleted from this by an optionally multiple extraction with a suitable solvent. The extractant used is preferably a strongly polar solvent which, following concentration by evaporation, can, optionally together with the extracted catalyst, be used again for the reaction. Suitable extractants are e.g. water, methanol, ethanol, dimethyl sulfoxide, dimethylformamide, ionic liquids such as e.g. 1-ethyl-3-methylimidazolium hydrogensulfate or 1-butyl-3-methylimidazolium methanesulfonate. It is also possible to remove the catalyst using a suitable absorber material. Separation can also take place by adding water or an ionic liquid to the product phase if the reaction is carried out in a solvent which is immiscible with water and/or the ionic liquid. If, in this connection, the catalyst dissolves preferentially in water or the ionic liquid, it can be separated off with the solvent from the organic product phase and optionally be reused. This can be effected by choosing suitable ligands.

If the reaction in step (a) is carried out in a solvent, then the amount of solvent is often selected such that the starting materials (i) and (ii) just dissolve in the solvent. In general, the weight ratio of the amount of solvent to the amount of starting materials (i) and (ii) is from 100:1 to 0.1:1, preferably from 10:1 to 0.1:1.

If the reaction in step (a) is carried out in a solvent, then this may be miscible with the product and can be separated off after the reaction by distillation. Suitable solvents are e.g. toluene, benzene, xylene, alkanes, e.g. hexanes, heptanes or octanes, acyclic and cyclic ethers such as diethyl ether or tetrahydrofuran, and also alcohols having more than three carbon atoms, in which the OH group is bonded to a tertiary carbon atom, for example tert-amyl alcohol. Preference is given to benzene, toluene, xylenes, alkanes, acyclic and cyclic ethers or alcohols having more than three carbon atoms, in which the OH group is bonded to a tertiary carbon atom, particular preference being given to toluene and tert-amyl alcohol. During the distillation, it is also possible to separate off unreacted, in particular nonpolar, starting materials.

In step (a), it is also possible to use solvents which have a miscibility gap with the product or the starting materials. As a result of suitable selection of the ligands, the catalyst dissolves preferentially in the polar phase. Suitable solvents in this case are e.g. water, sulfoxides such as dimethyl sulfoxide, formamides such as dimethylformamide, ionic liquids such as e.g. 1-ethyl-3-methylimidazolium hydrogensulfate and 1-butyl-3-methylimidazolium methanesulfonate, preferably water and ionic liquids.

The solvent in step (a) can, if present, also be miscible under the reaction conditions with the starting materials and the product and a polar phase such as water or ionic liquid and only after cooling form a second liquid phase which comprises the product. The majority of the catalyst is dissolved in the polar phase. This phase can, moreover, also comprise a fraction of the starting materials. The catalyst can then be separated off together with the polar phase and be reused. The fraction of catalyst present in the product can then be separated off by extraction, suitable absorber materials such as, for example, polyacrylic acid and salts thereof, sulfonated polystyrenes and salts thereof, activated carbons, montmorillonites, bentonites and also zeolites, or else can be left in the product.

In the case of the variant of the two-phase reaction procedure in step (a), suitable nonpolar solvents are particularly toluene, benzene, xylenes, alkanes, such as hexanes, heptanes and octanes, in combination with polar or hydrophilic ligands on the transition metal catalyst such as nitrogen-heterocyclic carbenes, polar phosphanes or cationic or anionic ligands, as a result of which the transition metal catalyst accumulates in the polar phase. In this variant, in which the solvent forms a nonpolar phase with the product and the catalyst and also optionally unreacted starting materials, with the water of reaction and optionally a further solvent added after the reaction, forms a polar phase, the majority of the catalyst and optionally unreacted starting materials can be separated off from the product phase by simple phase separation and be reused.

If volatile by-products or unreacted starting materials or else the added solvent are undesired, these can be separated off from the product without problems by distillation.

In a further variant, the reaction in step (a) is carried out in a polar solvent, in water or an ionic liquid. The product can be separated off by adding a nonpolar solvent which dissolves the product, but is immiscible with the solvent used for the reaction. Examples of the nonpolar solvent are toluene, benzene, alkanes, such as hexanes, heptanes or octanes, and acyclic or cyclic ethers, such as diethyl ether or tetrahydrofuran. If the catalyst dissolves preferentially in the polar phase, it can be separated off from the nonpolar product phase with the solvent and optionally be reused.

The reaction according to the invention in step (a) takes place in the liquid phase at a temperature of generally 20 to 250° C. Preferably, the temperature is at least 100° C. and preferably at most 200° C. The reaction can be carried out at a total pressure of from 0.1 to 25 MPa absolute, which may be either the pressure of hydrogen in combination with the intrinsic pressure of the solvent at the reaction temperature or else the pressure of a gas such as nitrogen or argon in combination with hydrogen. The average reaction time is generally 15 minutes to 100 hours.

In a preferred embodiment of the process according to the invention, in step (a), the water of reaction is separated off by homogeneously catalyzed alcohol amination during the reaction or preparation of polyalkylenepolyamines. This means that during the process in step (a) for the preparation of the polyalkylenepolyamines by reaction of (i) aliphatic amino alcohols with one another with the elimination of water or of (ii) aliphatic diamines or polyamines with aliphatic diols or polyols with the elimination of water, in each case in the presence of a homogeneous catalyst, the water of reaction is separated off. An additional removal of the water of reaction can in this connection also take place following the preparation of the polyalkylenepolyamines.

It may also be advantageous to remove the water formed during the reaction from the reaction mixture continuously. The water of reaction can be separated off directly by distillation from the reaction mixture or as an azeotrope with the addition of a suitable solvent (entrainer) and using a water separator, or be removed by adding water-withdrawing auxiliaries.

The addition of bases in step (a) can have a positive effect on the product formation. Suitable bases which may be mentioned here are alkali metal hydroxides, alkaline earth metal hydroxides, alkali metal alcoholates, alkaline earth metal alcoholates, alkali metal carbonates and alkaline earth metal carbonates, of which 0.01 to 100 equivalents can be used based on the metal catalyst used.

In a preferred embodiment of the process according to the invention, in step (a), the heteroatoms O or N of one of the starting materials (i) aliphatic amino alcohols, (ii) aliphatic diamines or polyamines or aliphatic diols or polyols are located in alpha and beta position on the chain of carbon atoms and thus on adjacent carbon atoms.

In a preferred embodiment of the process according to the invention, in step (a), the heteroatoms O or N of one of the starting materials (i) aliphatic amino alcohols, (ii) aliphatic diamines or polyamines or aliphatic diols or polyols are located in alpha and omega position on the chain of carbon atoms and thus at opposite ends of the chain of carbon atoms.

In a preferred embodiment of the process according to the invention, in step (a), polyalkylenepolyamines can be obtained in the presence of hydrogen gas.

Hydrogen gas can be injected while the water of reaction is separated off from the system continuously or discontinuously.

The polyalkylenepolyamines obtained by the described process in step (a) can be firstly isolated prior to reaction with alkylene oxides in step (b), or the reaction with alkylene oxides in step (b) takes place directly with the reaction solution from step (a).

The polyalkylenepolyamines obtained by the described process in step (a) are further modified in step (b) of the process according to the invention by reaction with alkylene oxides. In this process, primary or secondary amino groups probably react with the epoxides with ring opening. The preparation of alkoxylated amines is described for example in H. L. Sanders et al., Journal of the American Oil Chemists Society, 1969, 46, 167-170. Usually, the alkoxylation of amines and polyamines takes place in two stages: firstly, the amount of alkylene oxide used is such that an average degree of alkoxylation per NH function of 0.5 to 1.5, preferably from 0.75 to 1.25 mol of alkylene oxide per NH function is achieved. This step is usually carried out in water as solvent.

The further build-up of polyalkylene oxide chains takes place with base catalysis after removing the solvent, in particular water. The basic catalysts used are, for example: potassium hydroxide, sodium hydroxide, potassium methylate or sodium methylate, preferably potassium hydroxide, sodium hydroxide.

The alkylene oxides in step (b) generally comprise two or more carbon atoms, preferably from 2 to 20 carbon atoms, in particular from 2 to 12 carbon atoms.

When using different alkylene oxides, the build-up of the polyalkylene oxide chains can take place in the form of blocks or randomly.

The following structures, for example, are formed:

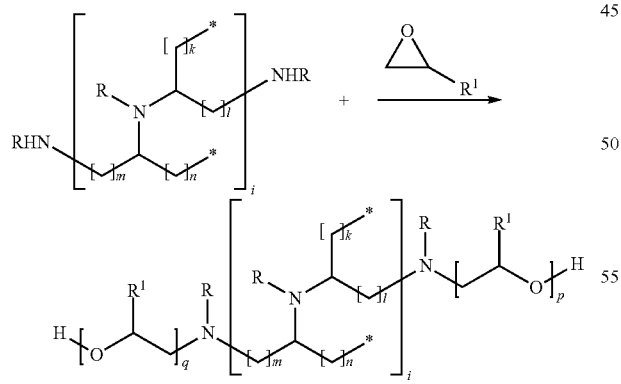

If the polyalkylenepolyamines also carry hydroxy functions, these are preferably likewise alkoxylated in a second step during the base-catalyzed reaction with alkylene oxides, as is illustrated by way of example in the following diagram:

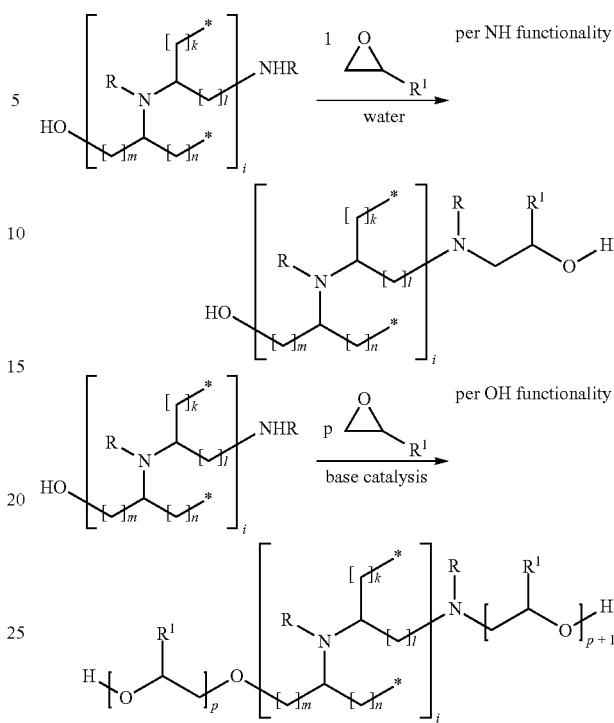

The alkylene oxides used in step (b) are preferably ethylene oxide, propylene oxide, 1,2-butylene oxide, 2,3-butylene oxide, pentene oxide, hexane oxide, dodecene oxide ($R^1$=H, $C_1$-$C_{18}$ alkyl, aryl). The degree of alkoxylation here is generally between from 0.5 to 100 alkylene oxide units/NH, preferably between from 1 to 50, particularly preferably between from 5 to 25/NH.

The invention further provides alkoxylated polyalkylenepolyamines, preferably alkoxylated polyethylenamine or alkoxylated polypropylenamine, which are prepared by the described embodiments of the process according to the invention comprising the steps (a) and (b).

The invention further provides alkoxylated polyalkylenepolyamines of the general formulae (I) to (V) or alkoxylated polyalkylenepolyamines comprising structures of the general formulae (I) to (V):

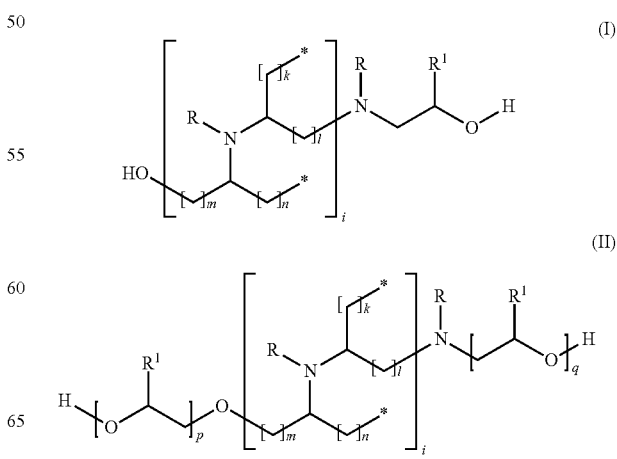

-continued

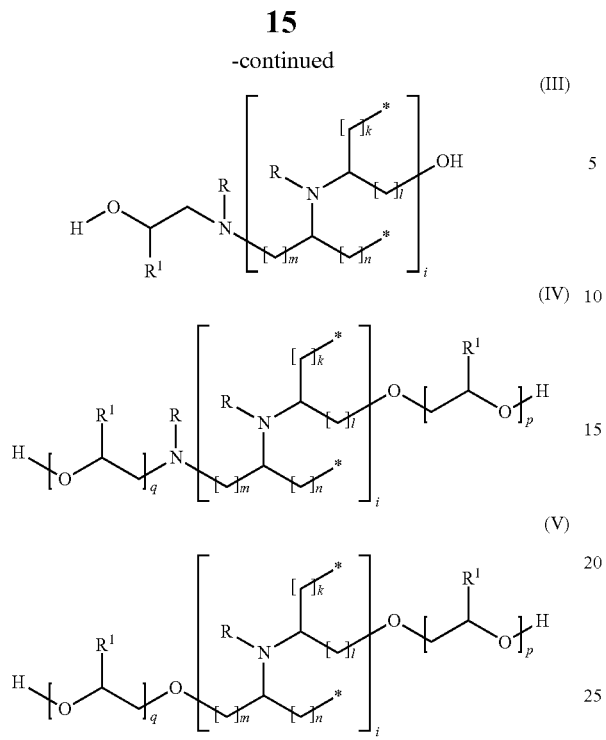

where
R independently of one another, are identical or different and are H, $C_1$-$C_{50}$-alkyl,
$R^1$ independently of one another, are identical or different and are H, $C_1$-$C_{18}$ alkyl, aryl
l, m independently of one another, are identical or different and are an integer from the range from 1 to 50, preferably from 1 to 30, particularly preferably from 1 to 20,
n, k independently of one another, are identical or different and are an integer from the range from 0 to 50, preferably from 0 to 30, particularly preferably from 0 to 20,
i is an integer from the range from 3 to 50 000,
p, q independently of one another, are identical or different and are an integer from the range from 0 to 100, preferably from 1 to 50, particularly preferably from 5 to 25.

The invention also relates to the uses of the alkoxylated polyalkylenepolyamines.

Alkoxylated polyamines such as, for example, alkoxylated polyethyleneimines, are used widely for example as a) detergent additives, b) dispersants, c) textile auxiliaries. The use of alkoxylated polyethyleneimines is described for example in the patent specifications: U.S. Pat. Nos. 4,891,260, 4,647,921, 4,654,043, and 4,645,611.

The invention further provides a process for the preparation of alkoxylated polyalkylenepolyamines in which polyalkylenepolyamines of the general formulae (I') to (III') or polyalkylenepolyamines comprising structures of the general formulae (I') to (III'):

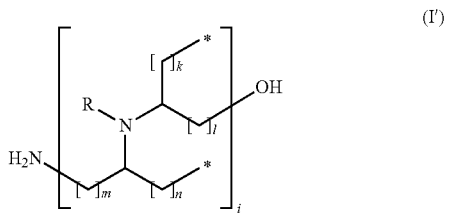

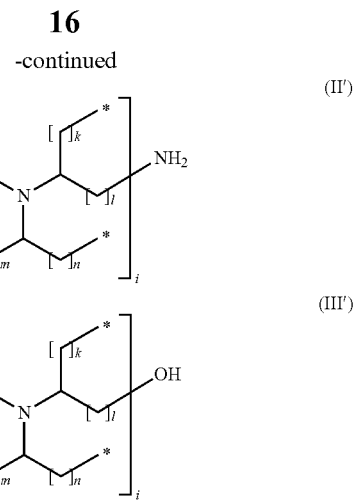

where
R independently of one another, are identical or different and are H, $C_1$-$C_{50}$-alkyl,
l, m independently of one another, are identical or different and are an integer from the range from 1 to 50, preferably from 1 to 30, particularly preferably from 1 to 20,
n, k independently of one another, are identical or different and are an integer from the range from 0 to 50, preferably from 0 to 30, particularly preferably from 0 to 20,
i is an integer from the range from 3 to 50 000,
are reacted with alkylene oxides to give alkoxylated polyalkylenepolyamines.

The present invention provides processes for the preparation of alkoxylated polyalkylenepolyamines in which no aziridine is used, no undesired co-products are formed and products of a desired chain length are obtained.

The invention is illustrated in more detail by the examples without the examples limiting the subject matter of the invention.

EXAMPLES

The content of primary amines, secondary amines and tertiary amines (mg KOH/g amine) is determined in accordance with ASTM D2074-07.

The OH number is determined in accordance with DIN 53240.

The base number is determined by potentiometric titration with hydrochloric acid in accordance with ASTM D4739-11.

The amine number is determined in accordance with DIN 53176.

Example 1

131.2 g of a polyalkylenepolyamine of ethanolamine, comprising 102 mg KOH/g primary amines, 563 mg KOH/g secondary amines and 76 mg KOH/g tertiary amines, were introduced as initial charge in an autoclave with 6.6 g of water at 90° C. The reactor was flushed several times with nitrogen and the temperature was increased to 120° C. At this temperature, 78.9 g of ethylene oxide were metered in and the mixture was after-stirred for 2 h. After cooling to 80° C., 6.3 g of aqueous potassium hydroxide solution (50% strength) were added, and the mixture was dewatered in vacuo at 120° C. The vacuum was raised with nitrogen and the temperature was increased to 140° C. At 140° C., 710.3 g of ethylene oxide were metered in over the course of 7 h. The mixture was then after-stirred for 5 h. The reaction mixture was cooled to 80° C.

and volatile constituents were removed in vacuo. This gave 930.0 g of a brown, viscous oil (OH number=226.4 mg KOH/g, base number=61.9 mg KOH/g, amine number=109.4 mg KOH/g) According to 1H-NMR, the composition corresponded to a polyalkylenepolyamine with 10 EO units/NH.

Example 2

161.4 g of a polyalkylenepolyamine of 1,2-pentanediol and 1,3-propanediamine, comprising 180 mg KOH/g primary amines, 304 mg KOH/g secondary amines and 34 mg KOH/g tertiary amines, were introduced as initial charge in an autoclave with 8.0 g of water at 90° C. The reactor was flushed several times with nitrogen and the temperature was increased to 100° C. At this temperature, 84.0 g of ethylene oxide were metered in, and the mixture was after-stirred for 1 h. After removing the volatile constituents in vacuo, 227 g of a brown oil were obtained (OH number: 496.5 mgKOH/g).

134.9 g of this oil were introduced as initial charge with 0.8 g of potassium tert-butylate in an autoclave. At 130° C., the reactor was flushed several times with nitrogen and, at this temperature, 262.6 g of ethylene oxide were injected. Following an after-stirring time of 1 h, the volatile constituents were removed in vacuo and 390 g of dark-brown oil, which is soluble in water to give a clear solution, were isolated. According to 1H-NMR, the composition corresponded to an oligomer of 1,3-propanediamine+1,2-pentanediol+5 EO/OH.

303.3 g of this oil and 1.2 g of potassium tert-butylate were introduced as initial charge in an autoclave and rendered inert at 130° C. several times with nitrogen. At 130° C., 601.1 g of ethylene oxide were metered in over the course of 3 h. After stirring for 2 h at 130° C., the volatile constituents were removed in vacuo and 900.3 g of a brown solid were isolated (OH number: 115.5 mgKOH/g, total amine: 42.6 mgKOH/g, tertiary amine: 5.6 mgKOH/g, base number: 37.6 mgKOH/g). The composition corresponded to an oligomer of 1,3-propanediamine+1,2-pentanediol+20 EO/OH.

The invention claimed is:

1. A process for preparing an alkoxylated polyalkylenepolyamine, the process comprising:
   (a) performing an alcohol amination, where:
      (i) aliphatic amino alcohols are reacted with one another; or
      (ii) an aliphatic polyamine is reacted with an aliphatic polyol;
   with the elimination of water in the presence of a catalyst to obtain a polyalkylenepolyamine;
   (b) reacting the polyalkylenepolyamine with alkylene oxide to obtain an alkoxylated polyalkylenepolyamine,
   wherein the catalyst comprises a monodentate or polydentate phosphine ligand.

2. The process of claim 1, wherein a phase separation occurs into at least one nonpolar phase and at least one polar phase after the amination (a).

3. The process of claim 1, wherein the catalyst is a transition metal complex catalyst.

4. The process of claim 1, wherein the amination (a) is carried out in the presence of a solvent or solvent mixture.

5. The process of claim 1, wherein, in the amination (a), the water of reaction is separated off during the preparation of polyalkylenepolyamine by catalyzed alcohol amination.

6. The process of claim 1, wherein the amination (a) is carried out in the presence of hydrogen gas.

7. The process of claim 1, wherein the alkylene oxide in the reacting (b) comprises two or more carbon atoms.

8. A process for preparing an alkoxylated polyalkylenepolyamine comprising: reacting a polyalkylenepolyamine with an alkylene oxide in the presence of a transition metal complex catalyst comprising ruthenium and/or iridium to give alkoxylated polyalkylenepolyamines;
   wherein: the polyalkylenepolyamine has a formula selected from the group consisting of:

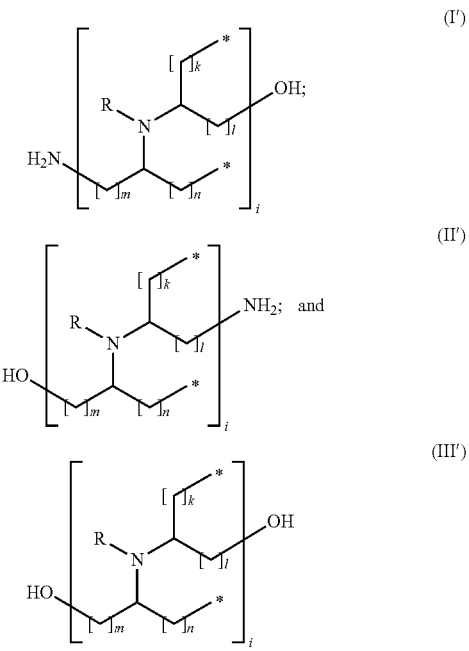

wherein
R is each independently identical or different and is H, or a $C_1$-$C_{50}$-alkyl group,
l and m are each independently identical or different and are an integer from the range from 1 to 50;
n and k are each independently identical or different and are an integer from the range from 0 to 50;
i is an integer from the range from 3 to 50 000; and
* represents a valence for bonding to another chemical group.

* * * * *